(12) United States Patent
Beck et al.

(10) Patent No.: US 9,810,288 B2
(45) Date of Patent: Nov. 7, 2017

(54) TRANSMISSION

(71) Applicant: ZF Friedrichshafen AG, Friedrichshafen (DE)

(72) Inventors: Stefan Beck, Eriskirch (DE); Christian Sibla, Friedrichshafen (DE); Martin Brehmer, Tettnang (DE); Josef Haupt, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 145 days.

(21) Appl. No.: 14/799,854

(22) Filed: Jul. 15, 2015

(65) Prior Publication Data

US 2016/0017961 A1   Jan. 21, 2016

(30) Foreign Application Priority Data

Jul. 15, 2014 (DE) .................. 10 2014 213 694

(51) Int. Cl.
*F16H 3/66* (2006.01)
*F16H 3/44* (2006.01)

(52) U.S. Cl.
CPC .............. *F16H 3/66* (2013.01); *F16H 3/666* (2013.01); *F16H 2003/442* (2013.01); *F16H 2200/0065* (2013.01); *F16H 2200/0069* (2013.01); *F16H 2200/2012* (2013.01); *F16H 2200/2046* (2013.01); *F16H 2200/2048* (2013.01); *F16H 2200/2097* (2013.01)

(58) Field of Classification Search
None
See application file for complete search history.

(56) References Cited

U.S. PATENT DOCUMENTS

| | | | |
|---|---|---|---|
| 7,824,302 B2 | 11/2010 | Diosi et al. | |
| 7,909,726 B2 | 3/2011 | Phillips et al. | |
| 8,133,148 B2 | 3/2012 | Wittkopp et al. | |
| 8,277,355 B2 * | 10/2012 | Hart ....................... | F16H 3/666 475/277 |
| 2008/0261755 A1 * | 10/2008 | Phillips .................... | F16H 3/66 475/276 |
| 2011/0245013 A1 * | 10/2011 | Kim ........................ | F16H 3/666 475/271 |
| 2012/0165153 A1 * | 6/2012 | Borgerson .............. | F16H 3/666 475/271 |

OTHER PUBLICATIONS

German Patent Office Search Report, dated Feb. 18, 2015.

* cited by examiner

*Primary Examiner* — Justin Holmes
(74) *Attorney, Agent, or Firm* — Dority & Manning, P.A.

(57) ABSTRACT

A transmission (G) is provided with four planetary gear sets (P1, P2, P3, P4), several shafts (W1-W8) and a first, second, third, fourth and fifth shift element (B1, B2, K1, K2, K3), the selective meshing of which brings about different transmission ratio relationships between a transmission input shaft (GW1) and a transmission output shaft (GW2). The second shift element (B2) and/or the fifth shift element (K3) is arranged, in a series at a sixth shift element (K4), in the power flow between the fifth shaft (W5) and a sun gear (So-P4) of the fourth planetary gear set (P4).

18 Claims, 11 Drawing Sheets

|   | B1 | B2 | K1 | K2 | K3 | K4 |
|---|----|----|----|----|----|----|
| 1 | X  | X  | X  |    |    | X  |
| 2 | X  | X  |    | X  |    | X  |
| 3 |    | X  | X  | X  |    | X  |
| 4 |    | X  |    | X  | X  | X  |
| 5 |    | X  | X  | X  | X  |    |
| 6 |    | X  | X  |    | X  | X  |
| 7 |    |    | X  | X  | X  | X  |
| 8 | X  |    | X  |    | X  | X  |
| 9 | X  |    |    | X  | X  | X  |
| R | X  | X  |    |    | X  | X  |

Fig. 3

|     | B1 | B2 | K1 | K2 | K3 | K4 | K5 |
|-----|----|----|----|----|----|----|----|
| 21  | X  | X  |    |    |    | X  | X  |
| 22  | X  | X  | X  |    |    | X  |    |
| 23  | X  | X  |    | X  |    | X  |    |
| 24  |    | X  | X  | X  |    | X  |    |
| 25  |    | X  |    | X  | X  | X  |    |
| 26  |    | X  | X  | X  | X  |    |    |
| 27  |    | X  | X  |    | X  | X  |    |
| 28  |    |    | X  | X  | X  | X  |    |
| 29  | X  |    | X  |    | X  | X  |    |
| 210 | X  |    |    | X  | X  | X  |    |
| 2R  | X  | X  |    |    | X  | X  |    |

Fig. 11

TRANSMISSION

FIELD OF THE INVENTION

The invention relates to a transmission with four planetary gear sets, several shafts and a first, second, third, fourth and fifth shift element, the selective meshing of which brings about different transmission ratio relationships between a transmission input shaft and a transmission output shaft. A first shaft is constantly connected to the transmission input shaft and to a bar of the third planetary gear set. A second shaft is constantly connected to the transmission output shaft and to a bar (also referred to as a planetary carrier) of the first planetary gear set, A third shaft is constantly connected to a sun gear of the third planetary gear set and can be fixed in a torque-proof manner through the first shift element. A fifth shaft is constantly connected to a ring gear of the second planetary gear set. A sixth shaft is constantly connected to a ring gear of the first planetary gear set. A ring gear of the third planetary gear set is constantly connected to a sun gear of the second planetary gear set and forms a component of a seventh shaft. An eighth shaft is constantly connected to a bar of the second planetary gear set. Two elements of the second planetary gear set are connected to each other through the fourth shift element, such that, with a locked fourth shift element, the ring gear, the bar and the sun gear have the same rotational speed. The invention also relates to a drive train for a motor vehicle with such a transmission.

BACKGROUND

Such transmissions are primarily used in motor vehicles, in order to adjust the drive unit's delivery capacity for rotational speed and turning moment to the driving resistance of the vehicle in a suitable manner.

A multi-stage transmission according to the preamble of claim 1 is known from the patent application DE 10 2005 014 592 A1 of the applicant, whereas this multi-stage transmission has eight forward gears.

SUMMARY OF THE INVENTION

It is a task of the invention to develop a transmission known in the state of the art into a transmission with nine forward gears. An additional task of the invention is to provide alternative embodiments of the transmission known in the state of the art. Additional objects and advantages of the invention will be set forth in part in the following description, or may be obvious from the description, or may be learned through practice of the invention.

The tasks are solved by the characteristics of the transmission embodiments described herein.

In accordance with the invention, in addition to the other elements specified in claim 1, a sixth shift element is arranged, in series at the second shift element and/or at the fifth shift element, in the power flow between the fifth shaft and a sun gear of the fourth planetary gear set. Through a disconnection, which is shiftable at least twice, of the previously torque-proof connection between the ring gear of the second planetary gear set and the sun gear of the fourth planetary gear set, an additional gear step is formed, which is to be arranged in the transmission ratio sequence of the transmission known in the state of the art between gears four and five. This additional gear step serves as the new fifth gear, and is formed through the locking of the second, third, fourth and fifth shift elements. In this new fifth gear, the first shift element and the sixth shift element are open. In all other gears, the sixth shift element is locked.

Through the new fifth gear, the gear jumps between the fourth and sixth gear are reduced. Thereby, upon use in a motor vehicle, the transmission can be better adapted to a fuel-consumption map of an internal combustion engine that is in operative drive connection with the transmission input shaft. Thereby, the fuel consumption of the vehicle can be reduced.

According to a first embodiment, the sun gear of the fourth planetary gear set is connected to a first shift element half of the second shift element. The fifth shaft is connected to a first shift element half of the sixth shift element. The second shift element half of the second shift element is connected to the second shift element half of the sixth shift element. The second shaft is connected to the eighth shaft through the fifth shift element. The first shaft is connectable through the third shift element to the second shift element half of the sixth shift element. In the first embodiment, a fourth shaft is constantly fixed in a torque-proof manner. In the first embodiment, the third shaft is constantly connected to the sun gear of the first planetary gear set. If the fourth shaft is connected to a ring gear of the fourth planetary gear set, the structure of the transmission is simplified through the torque-proof connection of the ring gear. A radial and axial swivel bearing of the ring gear that is otherwise necessary is eliminated.

According to a second embodiment, the sun gear of the fourth planetary gear set is connected to the second shift element half of the sixth shift element. The fifth shaft is connected to a first shift element half of the fifth shift element. A second shift element half of the fifth shift element is connected to the first shift element half of the sixth shift element. The first shaft is constantly connected to the eighth shaft. The first shaft is connectable through the third shift element with the sun gear of the fourth planetary gear set. In the second embodiment, the fourth shaft can be fixed in a torque-proof manner through the second shift element. In the first embodiment, the third shaft is constantly connected with the sun gear of the first planetary gear set. Through the arrangement of the fifth shift element that is changed when compared to the state of the art, the moment at support of the fifth shift element is reduced, since it is no longer in the power flow between the bar of the first planetary gear set and the bar of the second planetary gear set. Through the lower mechanical stress, the fifth shift element can therefore be structured smaller and lighter.

According to a third embodiment, a total of three shift elements are arranged in the power flow between the sun gear of the fourth planetary gear set and the fifth shaft. The sun gear of the fourth planetary gear set is connected to the first shift element half of the second shift element. The second shift element half of the second shift element is connected to the second shift element half of the sixth shift element. The first shift element half of the sixth shift element is connected to the second shift element half of the fifth shift element. The first shift element half of the fifth shift element is connected to the fifth shaft. In this third embodiment, the first shaft is connectable through the third shift element with the second shift element half of the second shift element. The fourth shaft is fixed in a torque-proof manner. The third shaft is connected to the sun gear of the first planetary gear set. The second shaft is connected to the eighth shaft. The third embodiment combines the advantages of the first and second embodiments.

According to a fourth embodiment, the sun gear of the fourth planetary gear set is connected to the second shift element half of the sixth shift element. The first shift element half of the sixth shift element is connected to the second shift element half of the fifth shift element. The first shift element half of the fifth shift element is connected to the fifth shaft. In this fourth embodiment, the first shaft is connectable through the third shift element with the sun gear of the fourth planetary gear set. The fourth shaft is fixed in a torque-proof manner. The third shaft is connectable through the second shift element with the sun gear of the first planetary gear set. The second shaft is connected to the eighth shaft. Through the arrangement of the fifth shift element that is changed when compared to the state of the art, in the power flow between the sun gear of the first planetary gear set and the sun gear of the third planetary gear set, the support moment of the fifth shift element is reduced, since it is no longer in the power flow between the bar of the first planetary gear set and the bar of the second planetary gear set. Through the lower mechanical stress, the fifth shift element can therefore be structured smaller and lighter.

For the first to fourth embodiments, the following applies: if the fourth planetary gear set is formed as a negative gear set, the ring gear of the fourth planetary gear set is a component of the fourth shaft, and the sixth shaft is connected to a bar of the fourth planetary gear set. If the fourth planetary gear set is formed as a positive gear set, the bar of the fourth planetary gear set is a component of the fourth shaft, and the sixth shaft is connected to the ring gear of the fourth planetary gear set.

According to a fifth embodiment, the sun gear of the fourth planetary gear set is connected to the second shift element half of the sixth shift element. The first shift element half of the sixth shift element is connected to the second shift element half of the fifth shift element. The first shift element half of the fifth shift element is connected to the fifth shaft. In this fifth embodiment, the third shaft is connected to the sun gear of the first planetary gear set. The first shaft is connectable through the third shift element with the sun gear of the fourth planetary gear set. The fourth shaft is fixed in a torque-proof manner. If the fourth planetary gear set is formed as a negative gear set, the ring gear of the fourth planetary gear set is a component of the fourth shaft, and the bar of the fourth planetary gear set is connectable through the second shift element with the sixth shaft. If the fourth planetary gear set is formed as a positive gear set, the bar of the fourth planetary gear set is a component of the fourth shaft, and the ring gear of the fourth planetary gear set is connectable through the second shift element with the sixth shaft.

The transmission has nine forward gears. The first forward gear is formed through the locking of the first shift element, the second shift element, the third shift element and the sixth shift element. The second forward gear is formed through the locking of the first shift element, the second shift element, the fourth shift element and the sixth shift element. The third forward gear is formed through the locking of the second shift element, the third shift element, the fourth shift element and the sixth shift element. The fourth forward gear is formed through the locking of the second shift element, the fourth shift element, the fifth shift element and the sixth shift element. The fifth forward gear is formed through the locking of the second shift element, the third shift element, the fourth shift element and the fifth shift element. The sixth forward gear is formed through the locking of the second shift element, the third shift element, the fifth shift element and the sixth shift element. The seventh forward gear is formed through the locking of the third shift element, the fourth shift element, the fifth shift element and the sixth shift element. The eighth forward gear is formed through the locking of the first shift element, the third shift element, the fifth shift element and the sixth shift element. The ninth forward gear is formed through the locking of the first shift element, the fourth shift element, the fifth shift element and the sixth shift element. A reverse gear is formed through the locking of the first shift element, the second shift element, the fifth shift element and the sixth shift element.

In accordance with one arrangement of the invention, the transmission has a seventh shift element. Through the seventh shift element, the first shaft is connectable to the eighth shaft. Thereby, the transmission receive one additional gear, and thus has, as a whole, ten forward gears. Thereby, the additional gear is characterized by a high transmission ratio between the transmission input shaft and the transmission output shaft. In other words, through the addition of the seventh shift element, the transmission receives a first gear with a particularly high transmission ratio, which increases the spread of the transmission. This first gear with a high transmission ratio is realized through the locking of the first, second, sixth and seventh shift elements. In all other gears, the seventh shift element is open. The formation of the remaining nine forward gears takes place analogously to the transmission with nine forward gears, such that the formation of the first to ninth gears of the nine-gear transmission corresponds to the formation of the second to tenth gears of the ten-gear transmission, whereas the seventh shift element in the second to tenth forward gears is open.

Preferably, the seventh shift element does not have a continuously variable capability of transferring turning moment. For example, the seventh shift element is formed as a claw shift element or a synchronization. Since the seventh shift element is open up to the first gear in all additional nine forward gears, in this manner, compared to frictional shift elements, the drag losses can be reduced with a variable turning moment transmission rate.

The fourth planetary gear set of the subject transmission may be designed as a positive gear set rather than as a negative gear set. In principle, each negative gear set may be replaced by a positive gear set, if the connections to the bar and the ring gear are interchanged, and the amount of the stationary transmission ratio is increased by the value of one. In the subject transmission, the fourth planetary gear set in particular is suitable for a formation as a positive gear set, since this is primarily in the power flow of the transmission in the low gears. In the nine-gear transmission described above, the second shift element is locked only in the first to sixth forward gears, such that the fourth planetary gear set is in the power flow of the transmission only in these gears. In the ten-gear transmission described above, the second shift element is locked in the first to seventh forward gears. Therefore, the lower degree of efficiency of the positive gear set when used in the transmission in a motor vehicle is of no consequence, since, in a motor vehicle, the losses in the high gears in particular reduce the degree of efficiency of the motor vehicle.

The sixth shift element is locked in all forward gears up to the fifth gear of the nine-gear transmission, or the sixth gear of the ten-gear transmission. As a result, in each gear, four of the six (or seven) shift elements are locked, by which the degree of efficiency of the transmission, as a result of drag losses, is not impaired because of the at least one additional shift element. This is particularly true if the seventh shift element is formed as a claw shift element.

Preferably, the second shift element does not have a continuously variable capability of transferring turning moment. For example, the second shift element is formed as a claw shift element or a synchronization. Since the second shift element opens only from the sixth to the seventh forward gear or, with the ten-gear transmission described above, only from the seventh to eighth forward gear, the torque applying upon the detaching of the shift element is comparatively low, by which the second shift element is particularly suitable for formation as a claw shift element. Since the second shift element is open in the high forward gears of seven to nine, or eight to ten, as the case may be, a formation as a claw shift element leads to an improvement in the degree of efficiency of the transmission in such high gears, since a claw shift element in the open state brings about drag losses that are lower than those as a frictional shift element. This is particularly relevant for the use of the transmission in a motor vehicle.

Preferably, the third planetary gear set is arranged radially within the second planetary gear set. Thereby, the need for axial installation space of the transmission is significantly reduced. This is particularly important for transmissions used in motor vehicles with front-cross drive trains.

The transmission may be a component of a drive train of a motor vehicle. The drive train has an internal combustion engine in addition to the transmission. The internal combustion engine is connected or connectable to the transmission input shaft of the transmission, either directly or through a clutch or through a hydrodynamic converter. For a reduction in the torsional vibrations, a torsional damper may be arranged in operative connection between the internal combustion engine and the transmission input shaft.

A shaft is not to be understood solely as, for example, a cylindrical, rotatably mounted machine element for the transfer of turning moments, but hereunder also as a general connection element that connects the individual components or elements to each other, in particular a connection element that connects several elements to each other in a torque-proof manner.

A planetary gear set includes a sun gear, a bar and a ring gear. Planetary gears, which mesh with the toothing of the sun gear and/or with the toothing of the ring gear, are rotatably mounted on the bar. A negative gear set describes a planetary gear set with a bar to which the planetary gears are rotatably mounted, with a sun gear and a ring gear, whereas the toothing of at least one of the planetary gears meshes with both the toothing of the sun gear and the toothing of the ring gear, by which the ring gear and the sun gear rotate in opposite directions if the sun gear is rotating with a fixed bar.

A positive gear set differs from the negative planetary gear set described above in that the positive gear set has inner and outer planetary gears, which are rotatably mounted at the bar. Thereby, the toothing of the inner planetary gears meshes, on the one hand, with the toothing of the sun gear and, on the other hand, with the toothing of the outer planetary gears. In addition, the toothing of the outer planetary gears meshes with the toothing of the ring gear.

This has the consequence that, with a fixed bar, the ring gear and the sun gear rotate in the same direction of rotation.

The stationary transmission ratio defines the rotational speed ratio between the sun gear and the ring gear of a planetary gear set with a torque-proof bar. Since, with a negative gear set, the direction of rotation between the sun gear and the ring gear with a torque-proof bar is reversed, the stationary transmission ratio with a negative gear set always takes a negative value.

Through shift elements, depending on the operating state, a relative movement between two components is permitted, or a connection for transferring a turning moment between the two components is established. A relative movement is to be understood, for example, as a rotation of two components, whereas the rotational speed of the first component and the rotational speed of the second component differ. In addition, the rotation of only one of the two components is also conceivable, while the other component is at a standstill or is rotating in the opposite direction.

Each shift element has a first shift element half and a second shift element half. The first shift element half is connected to the first component, with which the shift element establishes a connection. The second shift element half is connected to the second component, with which the shift element establishes a connection. If the shift element is locked, the first shift element half and the second shift element half work together, such that both components are connected in a torque-proof manner. If the shift element is open, the first and second shift element halves do not work together, such that the two components can take different rotational speeds.

Two elements are designated as connected to each other in particular if a fixed (in particular, a torque-proof) connection exists between the elements. Such connected elements rotate with the same rotational speed. The various components and elements of the specified invention may be connected to each other through a shaft and/or through a locked shift element or a connection element, or also directly, for example by means of a welded connection, crimped connection or another connection.

Two elements are designated as "connectable" if there is a detachable, torque-proof connection between such elements. If the connection exists, such elements rotate at the same rotational speed.

BRIEF DESCRIPTION OF THE DRAWINGS

Embodiments of the invention are described in detail below on the basis of the attached figures.

FIG. 3 shows a shifting diagram of the first arrangement of the transmission;

FIG. 11 shows a shifting diagram according to the eighth arrangement of the transmission.

DETAILED DESCRIPTION

Figure 1:
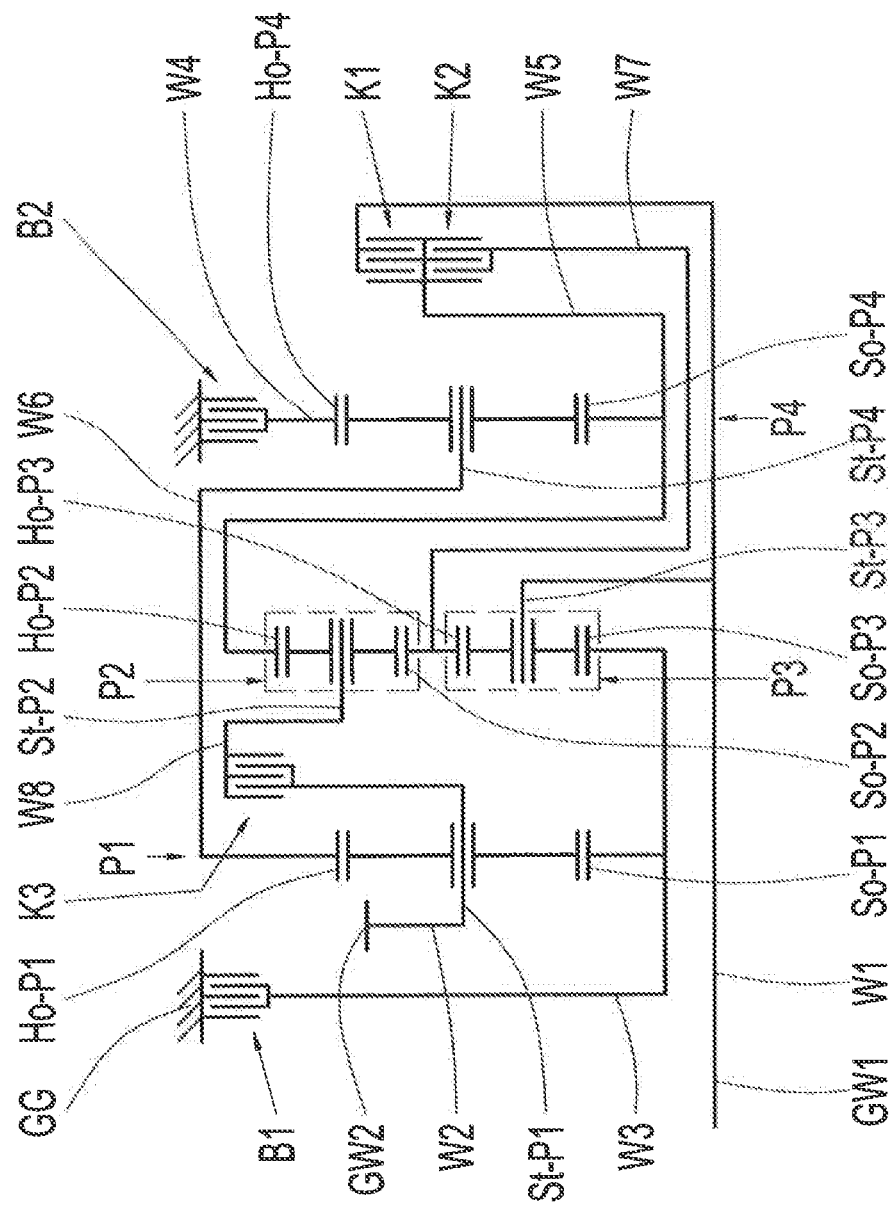
FIG. 1 schematically shows a transmission according to the state of the art.

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

FIG. 1 schematically shows a transmission according to the state of the art. The transmission comprises four planetary gear sets P1, P2, P3, P4, which are all formed as negative gear sets. The third planetary gear set P3 is arranged radially within the second planetary gear set P2, whereas a ring gear Ho-P3 of the third planetary gear set P3 is connected to a sun gear So-P2 of the second planetary gear set P2 and is a component of a seventh shaft W7. A sun gear So-P3 of the third planetary gear set P3 is a component of a third shaft W3 and is connected to a sun gear So-P1 of the first planetary gear set P1. A bar St-P3 of the third planetary gear set P3 is connected to a transmission input shaft GW1 and is a component of a first shaft W1. A bar St-P2 of the second planetary gear set P2 is a component of a eighth shaft W8. A ring gear Ho-P2 of the second planetary gear set P2 is a component of a fifth shaft W5 and is connected to a sun gear So-P4 of the fourth planetary gear set P4. A ring gear Ho-P4 of the fourth planetary gear set P4 is a component of a fourth shaft W4. A bar St-P1 of the first planetary gear set P1 is a component of a second shaft W2 and is connected to a transmission output shaft GW2. A ring gear Ho-P1 of the first planetary gear set P1 is a component of a sixth shaft W6 and is connected to a bar St-P4 of the fourth planetary gear set P4.

Through a first shift element B1, the third shaft W3 is connectable in a torque-proof manner with a transmission housing GG or another torque-proof structural element of the transmission. Through a second shift element B2, the fourth shaft W4 can be fixed in a torque-proof manner in the same manner. Through a third shift element K1, the first shaft W1 is connectable to the sun gear So-P4 of the fourth planetary gear set P4. Through a fourth shift element K2, the ring gear Ho-P2 is connectable to the sun gear So-P2 of the second planetary gear set P2. If the fourth shift element K2 is locked, the sun gear So-P2, the bar St-P2 and the ring gear Ho-P2 of the second planetary gear set P2 rotate with same rotational speed. Through the fifth shift element K3, the eighth shaft W8 is connectable to the second shaft W2.

Figure 2:
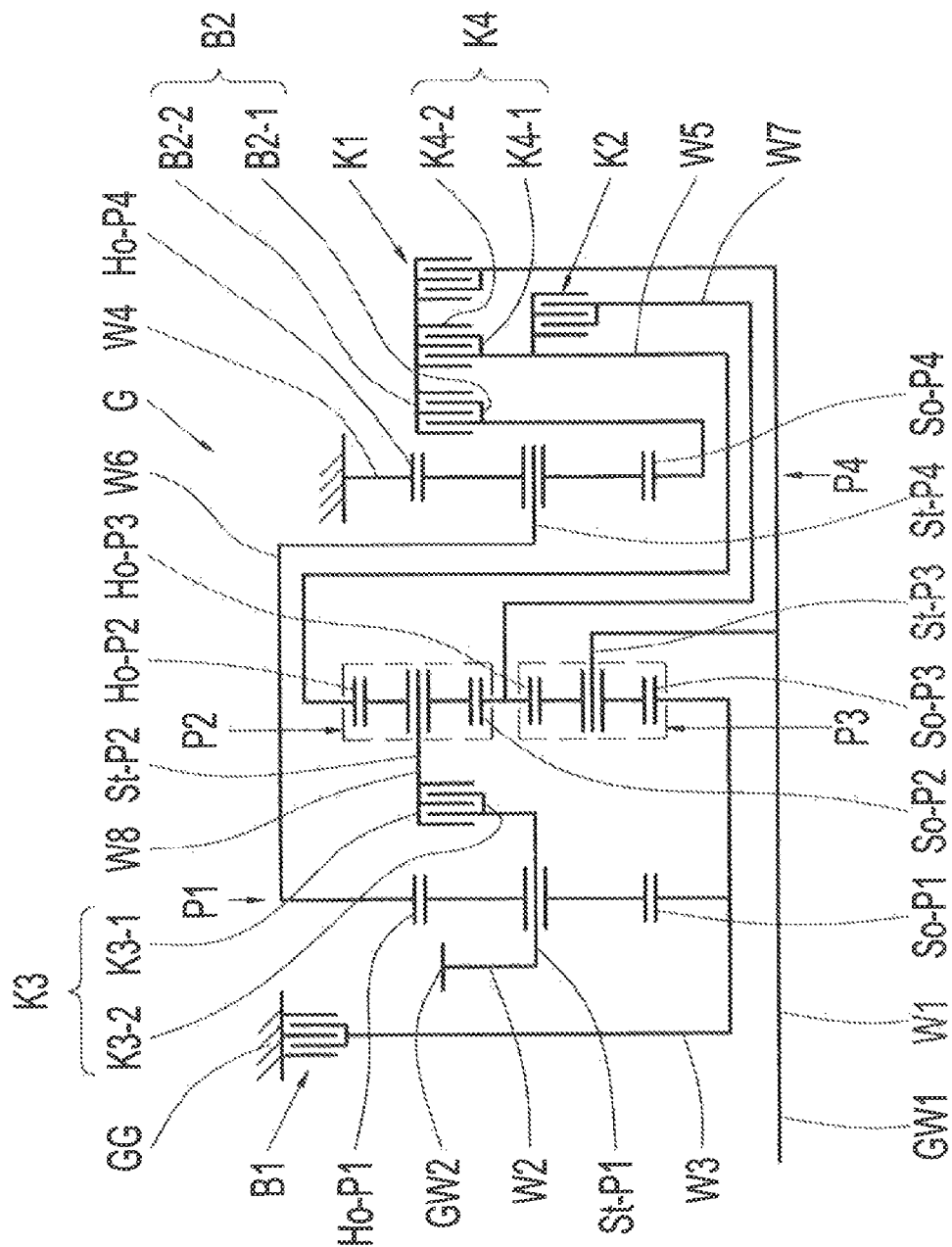
FIG. 2 schematically shows a transmission according to a first arrangement.

FIG. 2 shows a transmission G according to a first arrangement of the invention. In contrast to the transmission known in the state of the art, the second shift element B2 and a sixth shift element K4 are arranged in series in the power flow between the ring gear Ho-P2 of the second planetary gear set P2 and the sun gear So-P4 of the fourth planetary gear set P4. The sun gear So-P4 of the fourth planetary gear set P4 is connected to a first shift element half B2-1 of the second shift element B2. The ring gear Ho-P2 of the second planetary gear set P2 is connected to a first shift element half K4-1 of the sixth shift element K4. A second shift element half B2-2 of the second shift element B2 is connected to a second shift element half K4-2 of the sixth shift element K4. The fourth shaft W4, connected to the ring gear Ho-P4 of the fourth planetary gear set P4, is fixed in a torque-proof manner. The first shaft W1 is connected through the third shift element K1 with the second shift element half K4-2 of the sixth shift element K4.

FIG. 3 shows a shifting diagram according to the first arrangement of the transmission G. Therein, nine forward gears 1 to 9 and one reverse gear R are indicated in the rows. In the associated columns, which of the shift elements B1, B2, K1, K2, K3, K4 must be locked in order to form the respective gear 1-9 is represented by an X.

The first forward gear 1 arises through the locking of the first shift element B1, the second shift element B2, the third shift element K1 and the sixth shift element K4. The second forward gear 2 arises through the locking of the first shift element B1, the second shift element B2, the fourth shift element K2 and the sixth shift element K4. The third forward gear 3 arises through the locking of the second shift element B2, the third shift element K1, the fourth shift element K2 and the sixth shift element K4. The fourth forward gear 4 arises through the locking of the second shift element B2, the fourth shift element K2, the fifth shift element K3 and the sixth shift element K4. The fifth forward gear 5 arises through the locking of the second shift element B2, the third shift element K1, the fourth shift element K2 and the fifth shift element K3. The sixth forward gear 6 arises through the locking of the second shift element B2, the third shift element K1, the fifth shift element K3 and the sixth shift element K4. The seventh forward gear 7 arises through the locking of the third shift element K1, the fourth shift element K2, the fifth shift element K3 and the sixth shift element K4. The eighth forward gear 8 arises through the locking of the first shift element B1, the third shift element K1, the fifth shift element K3 and the sixth shift element K4. The ninth forward gear 9 arises through the locking of the first shift element B1, the fourth shift element K2, the fifth shift element K3 and the sixth shift element K4. The reverse gear R arises through the locking of the first shift element B1, the second shift element B2, the fifth shift element K3 and the sixth shift element K4.

Figure 4:
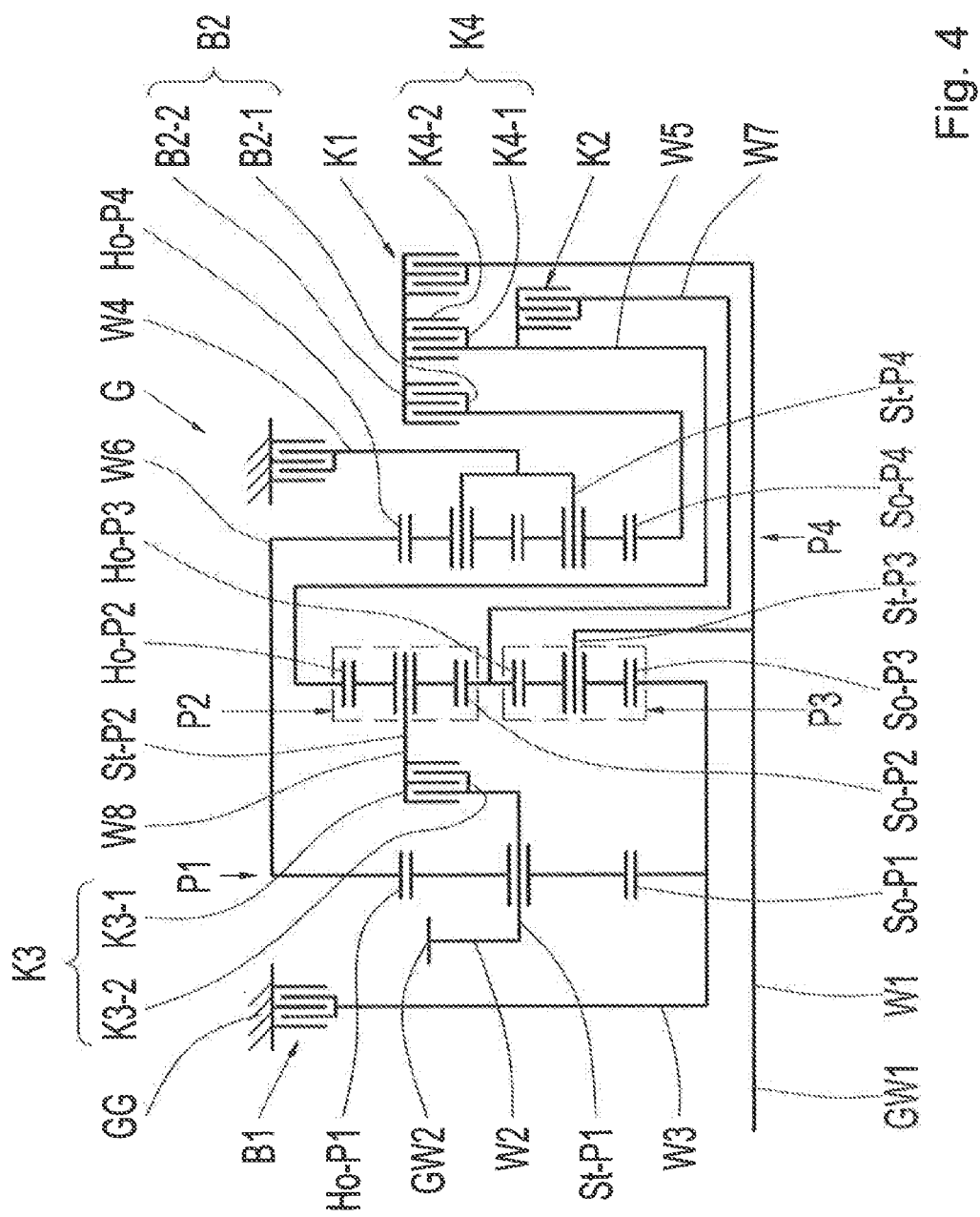
FIG. 4 schematically shows a transmission according to a second arrangement.

FIG. 4 schematically shows a transmission G according to a second arrangement of the invention. In contrast to the first arrangement, the fourth planetary gear set P4 in the second arrangement is formed as a positive gear set. Accordingly, the shafts W6, W4 connected to the ring gear Ho-P4 and the bar St-P4 of the fourth planetary gear set P4 are interchanged. The sixth shaft W6 is now connected to the ring gear Ho-P4 of the fourth planetary gear set P4, while the fourth shaft W4 is now connected to the bar St-P4 of the fourth planetary gear set P4. If the fourth planetary gear set P4 is formed as a positive gear set, in addition to the interchange of the allocation of the ring gear and the bar, the amount of the stationary transmission ratio is increased by the value of one, in order to achieve the same transmission ratio effect as that of the negative gear set.

Figure 5:
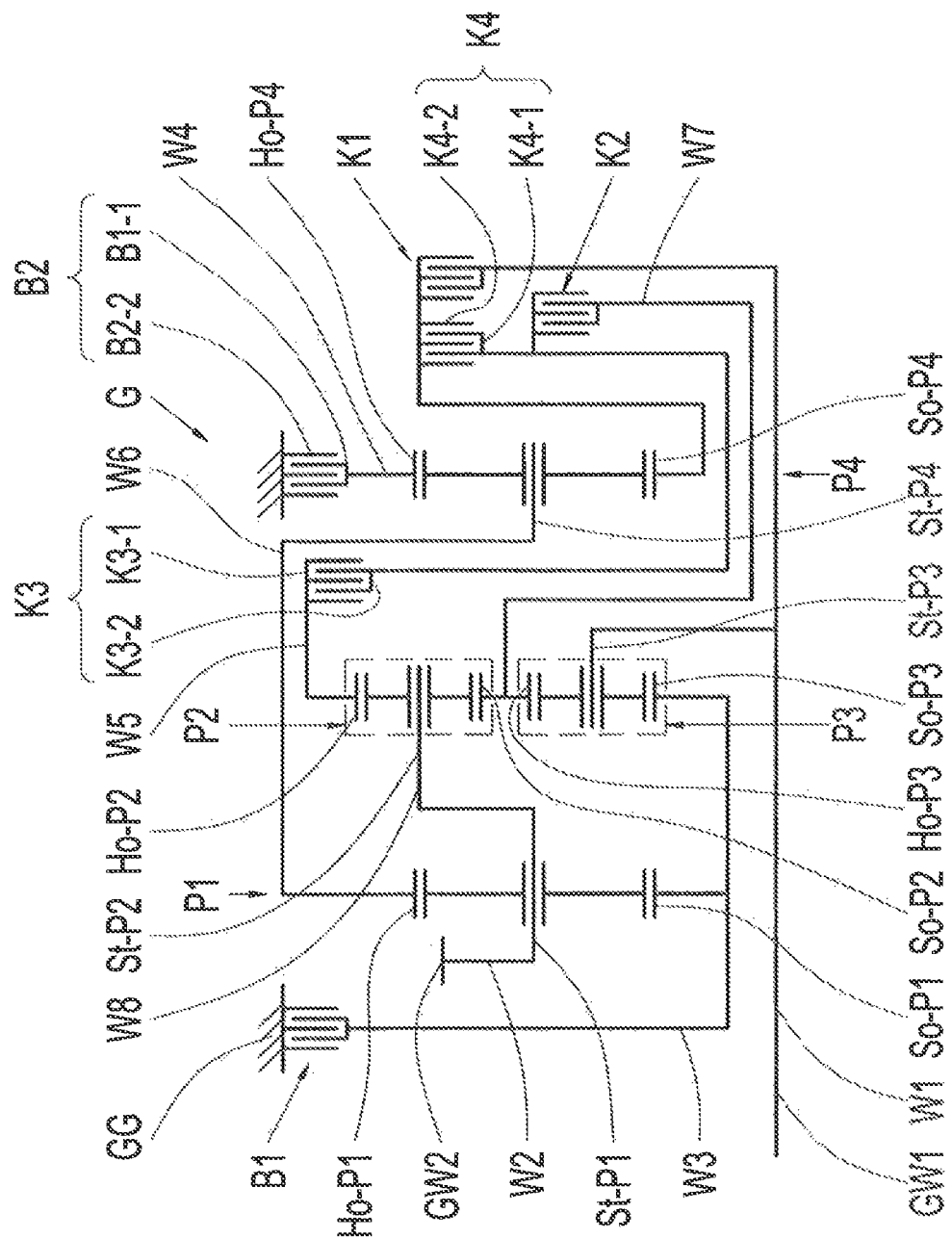
FIG. 5 schematically shows a transmission according to a third arrangement.

FIG. 5 schematically shows a transmission G according to a third arrangement of the invention. In contrast to the first arrangement, the fourth shaft W4, connected to the ring gear Ho-P4 of the fourth planetary gear set P4, can be fixed in a torque-proof manner through the second shift element B2. The ring gear Ho-P2 of the second planetary gear set P2 is connected to a first shift element half K3-1 of the fifth shift element K3. The sun gear So-P4 of the fourth planetary gear set P4 is connected to the second shift element half K4-2 of the sixth shift element K4. The first shift element half K4-1 of the sixth shift element K4 is connected to a second shift element half K3-2 of the fifth shift element K3. The bar St-P1 of the first planetary gear set P1 is connected to the bar St-P2 of the second planetary gear set P2. The first shaft W1 is connectable through the third shift element K1 with the sun gear So-P4 of the fourth planetary gear set P4.

Figure 6:
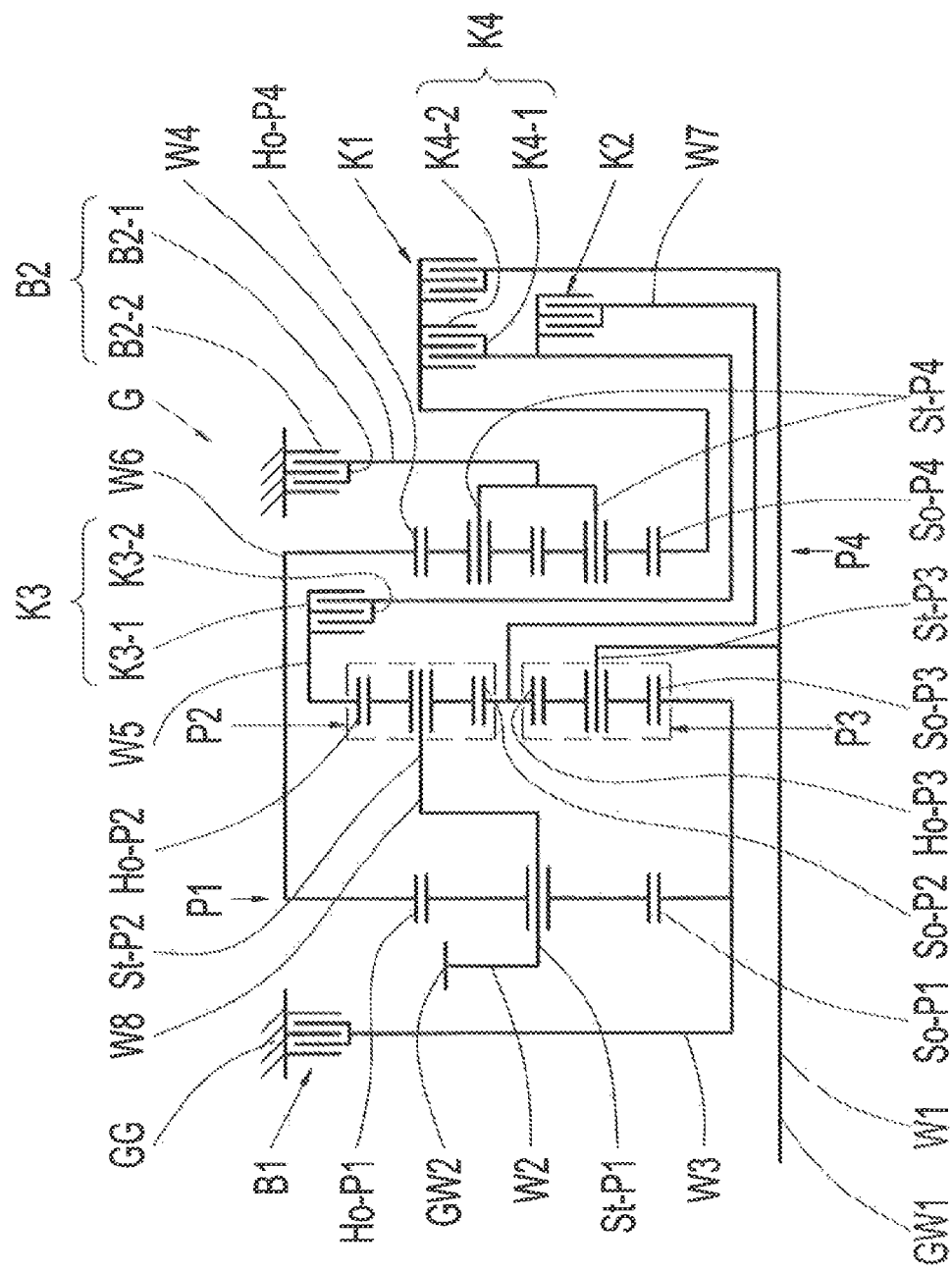
FIG. 6 schematically shows a transmission according to a fourth arrangement.

FIG. 6 schematically shows a transmission G according to a fourth arrangement of the invention. In contrast to the third arrangement, the fourth planetary gear set P4 is formed as a positive gear set. Accordingly, the shafts W6, W4 connected to ring gear Ho-P4 and the bar St-P4 of the fourth planetary gear set P4 are interchanged. The sixth shaft W6 is now connected to the ring gear Ho-P4 of the fourth planetary gear set P4, while the fourth shaft W4 is now connected to the bar St-P4 of the fourth planetary gear set P4, and can be fixed in a torque-proof manner through the second shift element B2. The stationary transmission ratio of the fourth planetary gear set P4 is to be adjusted in a manner corresponding to the second arrangement.

Figure 7:
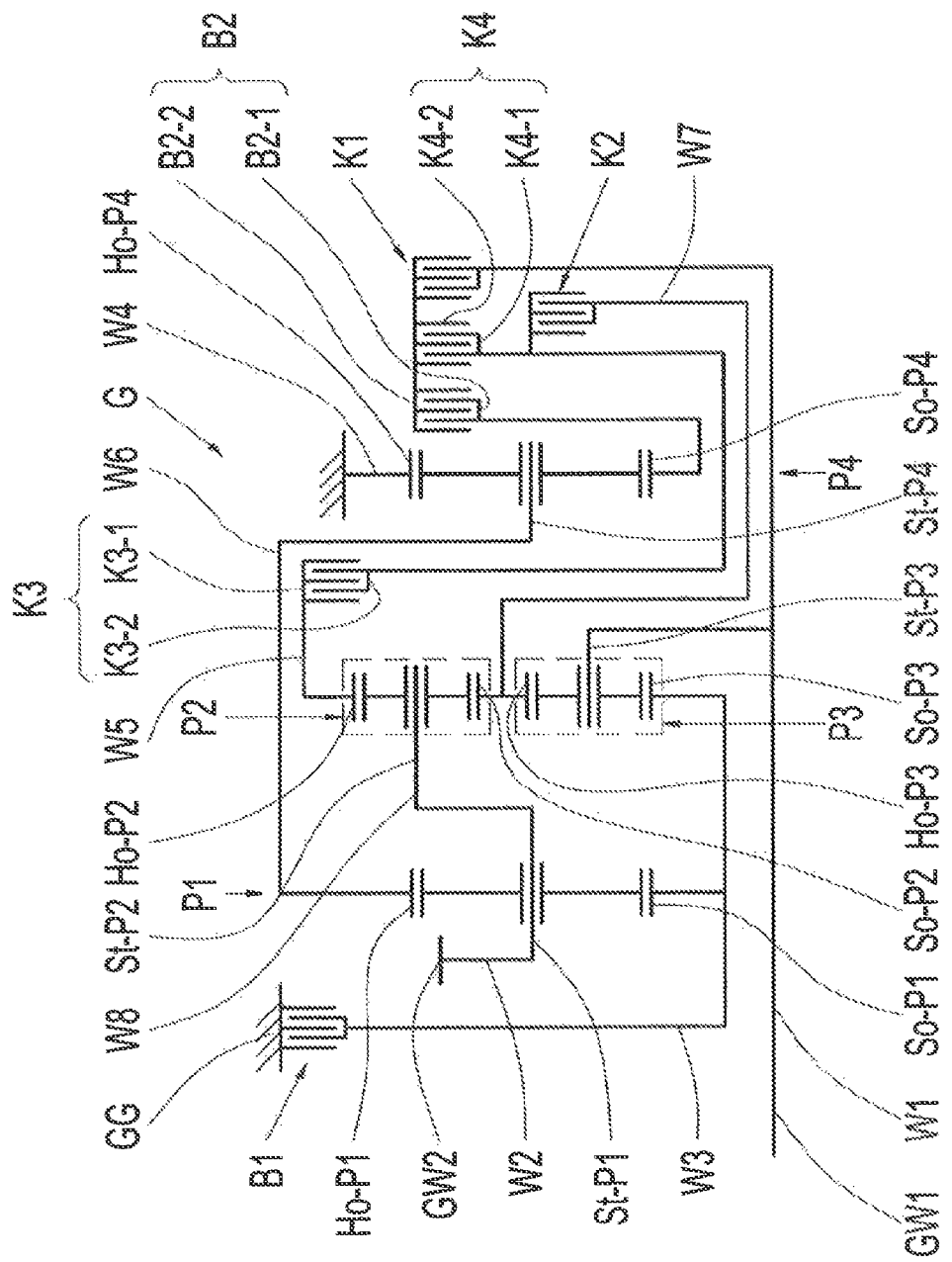
FIG. 7 schematically shows a transmission according to a fifth arrangement.

FIG. 7 schematically shows a transmission G according to a fifth arrangement of the invention. In this fifth arrangement, a total of three shift elements are arranged in the power flow between the ring gear Ho-P2 of the second planetary gear set P2 and the sun gear So-P4 of the fourth planetary gear set P4. The ring gear Ho-P2 of the second planetary gear set P2 is connected to the first shift element half K3-1 of the fifth shift element K3. The second shift element half K3-2 of the fifth shift element K3 is connected to the first shift element half K4-1 of the sixth shift element K4. The second shift element half K4-2 of the sixth shift element K4 is connected to the second shift element half B2-2 of the second shift element B2. The first shift element half B2-1 of the second shift element B2 is connected to the sun gear So-P4 of the fourth planetary gear set P4. The first shaft W1 is connectable through the third shift element K1 with the second shift element half K4-2 of the sixth shift element K4. The second shaft W2 is connected to the eighth shaft W8. The third shaft W3 is connected to the sun gear So-P1 of the first planetary gear set P1. The fourth shaft W4 is fixed in a torque-proof manner and is connected to the ring gear Ho-P4 of the fourth planetary gear set P4.

Figure 8:
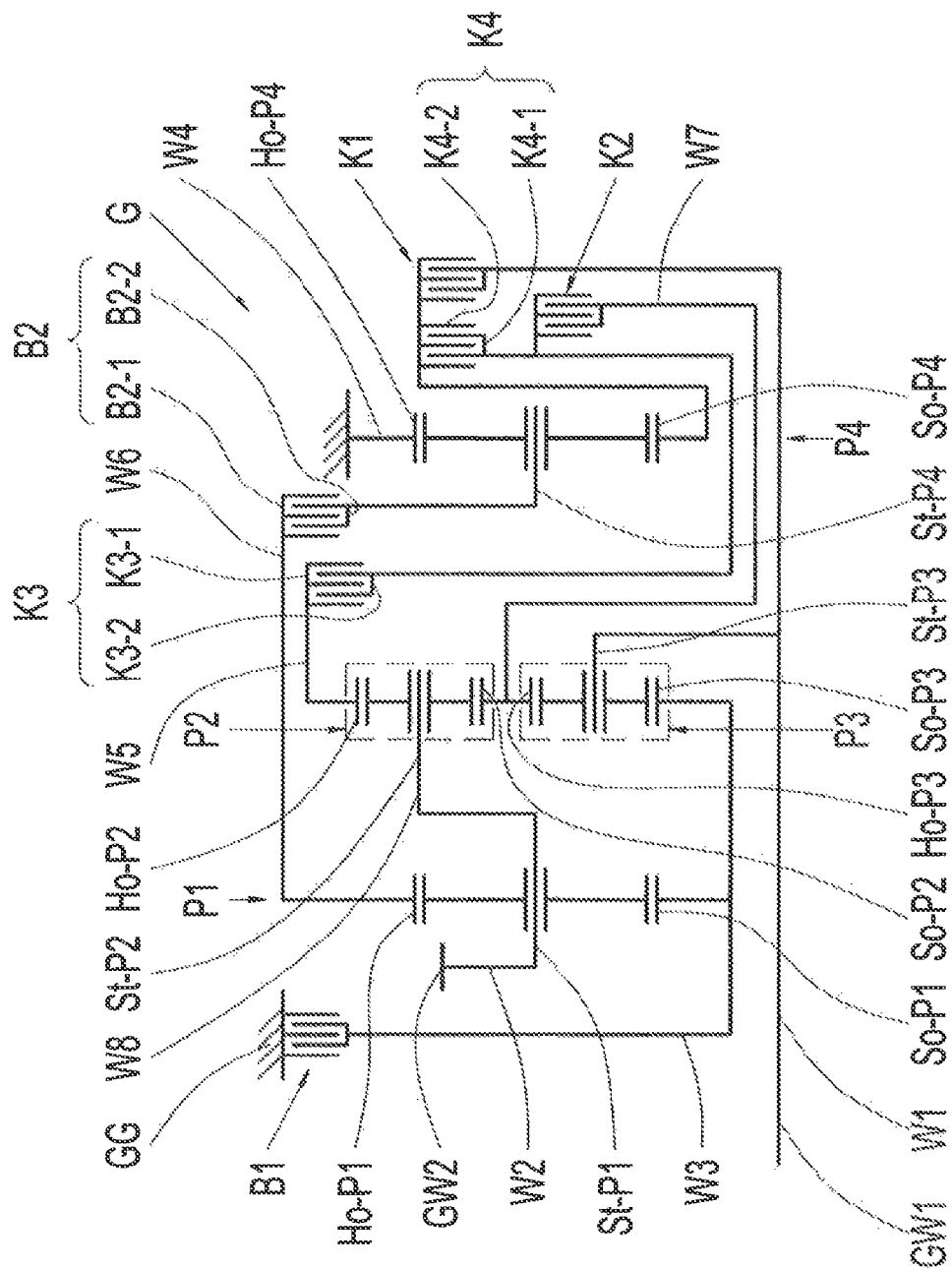
FIG. 8 schematically shows a transmission according to a sixth arrangement.

FIG. 8 schematically shows a transmission G according to a sixth arrangement of the invention. In the sixth arrangement, the sun gear So-P4 of the fourth planetary gear set P4 is connected to the second shift element half K4-2 of the sixth shift element K4. The first shift element half K4-1 of the sixth shift element K4 is connected to the second shift element half K3-2 of the fifth shift element K3. The first shift element half K3-1 of the fifth shift element K3 is connected to the ring gear Ho-P2 of the second planetary gear set P2. The first shaft W1 is connectable through the third shift element K1 with the sun gear So-P4 of the fourth planetary gear set P4. The sixth shaft W6 is connected through the second shift element B2 with the bar St-P4 of the fourth planetary gear set P4. The second shaft W2 is connected to the eighth shaft W8. The third shaft W3 is connected to the sun gear So-P1 of the first planetary gear set P1. The fourth shaft W4 is fixed in a torque-proof manner and is connected to the ring gear Ho-P4 of the fourth planetary gear set P4.

Figure 9:
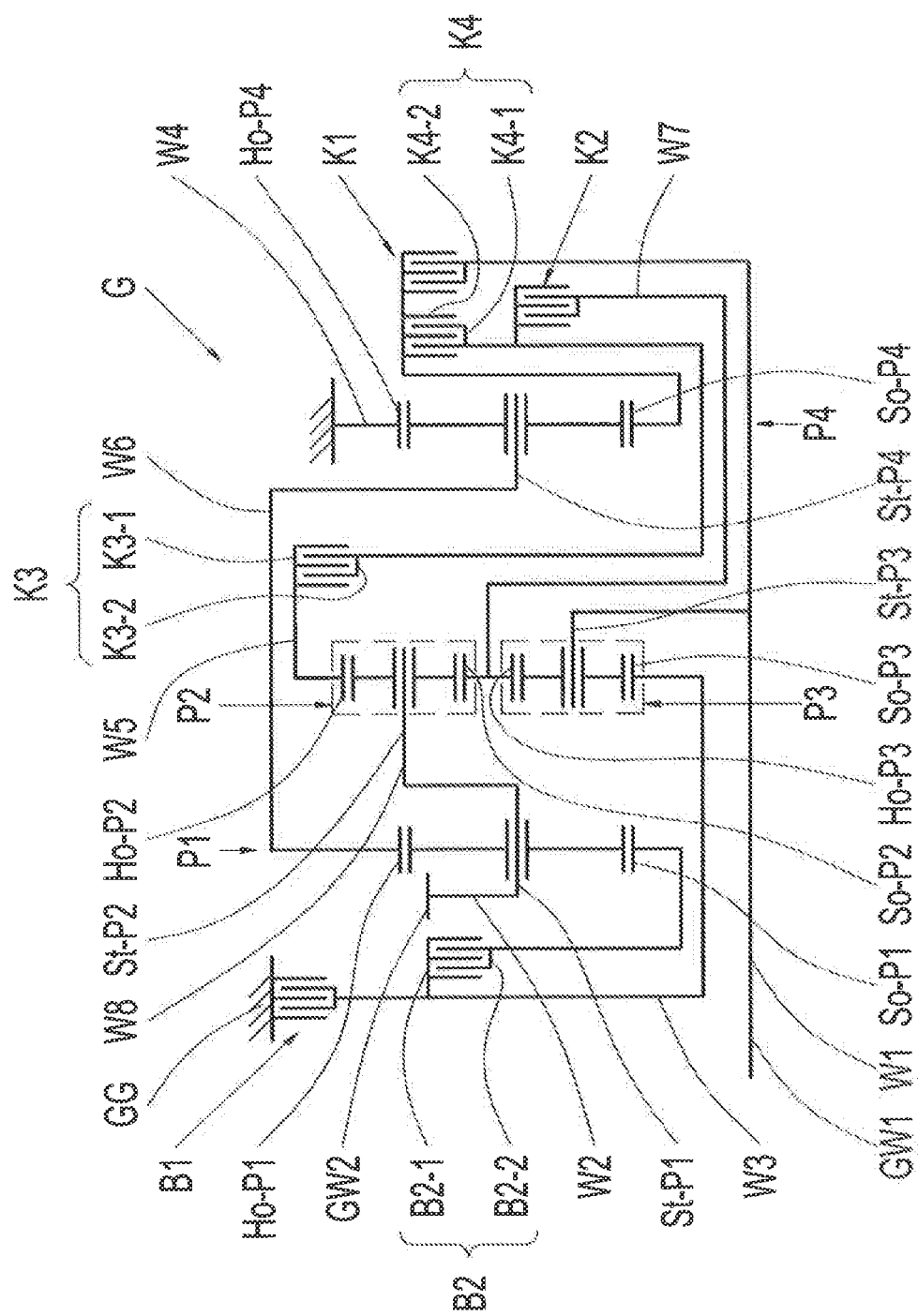
FIG. 9 schematically shows a transmission according to a seventh arrangement.

FIG. 9 schematically shows a transmission G according to a seventh arrangement of the invention. In contrast to the sixth arrangement, the second shift element B2 is now arranged in the power flow between the third shaft W3 and the sun gear So-P1 of the first planetary gear set P1. The sixth shaft W6 is connected to the bar St-P4 of the fourth planetary gear set P4.

Each of the first to seventh arrangements of the transmission G has nine forward gears 1 to 9 and one reverse gear R, whereas the formation of the gears 1-9, R for all designs in accordance with the first to seventh arrangements is identical.

Figure 10:
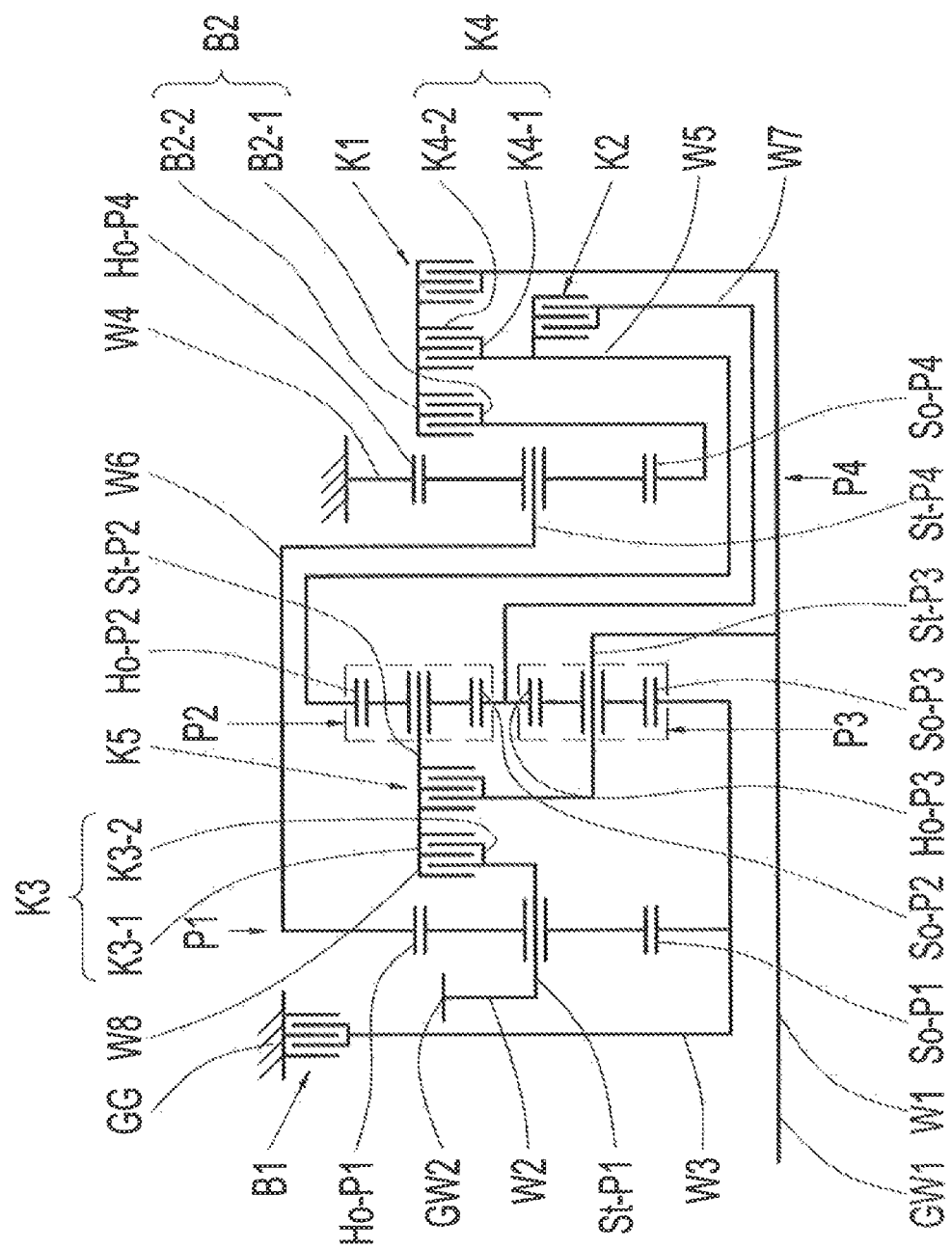
FIG. 10 schematically shows a transmission according to an eighth arrangement.

FIG. 10 schematically shows a transmission G according to an eighth arrangement of the invention. In contrast to the first arrangement, the transmission G in the eighth arrangement includes a seventh shift element K5, through which the first shaft W1 is connectable to the eighth shaft W8.

FIG. 11 shows a schematic diagram of the transmission G according to the eighth arrangement of the invention. Therein, ten forward gears 21 to 210 and one reverse gear 2R are indicated in the rows. In the associated columns, which of the shift elements B1, B2, K1, K2, K3, K4, K5 must be locked in order to form the respective gear 21-210, 2R is represented by an X. The first forward gear 21 is formed through the locking of the first shift element B1, the second shift element B2, the sixth shift element K4 and the seventh shift element K5. The formation of the second to the tenth forward gears 22-210 in the ninth arrangement corresponds to the formation of the first to ninth forward gears 1-9 of the first through eighth arrangements, whereas the seventh shift element K5 is open in the second to tenth forward gears 21-210. The formation of the reverse gear 2R of the ninth arrangement is identical to the formation of the reverse gear R in the first to eighth arrangements, whereas the seventh shift element K5 is open in the reverse gear 2R.

Modifications and variations can be made to the embodiments illustrated or described herein without departing from the scope and spirit of the invention as set forth in the appended claims.

REFERENCE SIGNS

G Transmission
GG Transmission housing
GW1 Transmission input shaft
GW2 Transmission output shaft
B1 First shift element
B2 Second shift element
B2-1 First shift element half of the second shift element
B2-2 Second shift element half of the second shift element
K1 Third shift element
K2 Fourth shift element
K3 Fifth shift element
K3-1 First shift element half of the fifth shift element
K3-2 Second shift element half of the fifth shift element
K4 Sixth shift element
K4-1 First shift element half of the sixth shift element
K4-2 Second shift element half of the sixth shift element
K5 Seventh shift element
P1 First planetary gear set
P2 Second planetary gear set
P3 Third planetary gear set
P4 Fourth planetary gear set
So-P1 Sun gear of the first planetary gear set
St-P1 Bar of the first planetary gear set
Ho-P1 Ring gear of the first planetary gear set
So-P2 Sun gear of the second planetary gear set
St-P2 Bar of the second planetary gear set
Ho-P2 Ring gear of the second planetary gear set
So-P3 Sun gear of the third planetary gear set
St-P3 Bar of the third planetary gear set
Ho-P3 Ring gear of the third planetary gear set
So-P4 Sun gear of the fourth planetary gear set
St-P4 Bar of the fourth planetary gear set
Ho-P4 Ring gear of the fourth planetary gear set
W1 First shaft
W2 Second shaft
W3 Third shaft
W4 Fourth shaft
W5 Fifth shaft
W6 Sixth shaft
W7 Seventh shaft
W8 Eighth shaft
1-9 First to ninth forward gears
21-210 First to tenth forward gears
R/2R Reverse gear

The invention claimed is:

1. A transmission (G), comprising:
four planetary gear sets (P1, P2, P3, P4), a plurality of shafts (W1-W8), and a first, second, third, fourth and fifth shift element (B1, B2, K1, K2, K3), wherein the selective meshing of the shift elements brings about different transmission ratio relationships between a transmission input shaft (GW1) and a transmission output shaft (GW2);
a first one of the shafts (W1) constantly connected to the transmission input shaft (GW1) and to a bar (St-P3) of the third planetary gear set (P3);
a second one of the shafts (W2) constantly connected to the transmission output shaft (GW2) and to a bar (St-P1) of the first planetary gear set (P1);
a third one of the shafts (W3) constantly connected to a sun gear (So-P3) of the third planetary gear set (P3) and fixable in a torque-proof manner through the first shift element (B1);
a fifth one of the shafts (W5) constantly connected to a ring gear (Ho-P2) of the second planetary gear set (P2);
a sixth one of the shafts (W6) constantly connected to a ring gear (Ho-P1) of the first planetary gear set (P1);
a ring gear (Ho-P3) of the third planetary gear set (P3) constantly connected to a sun gear (So-P2) of the second planetary gear set (P2) and forming a component of a seventh one of the shafts (W7);
an eighth one of the shafts (W8) constantly connected to a bar (St-P2) of the second planetary gear set (P2);
two elements of the second planetary gear set (P2) connected to each other through the fourth shift element (K2), such that, with a locked fourth shift element (K2), the ring gear (Ho-P2), the bar (St-P2) and the sun gear (So-P2) have the same rotational speed; and
one of the second shift element (B2) or the fifth shift element (K3) arranged in series with a sixth shift element (K4) in the power flow between the fifth shaft (W5) and a sun gear (So-P4) of the fourth planetary gear set (P4).

2. The transmission (G) according to claim 1, wherein:
the sun gear (So-P4) of the fourth planetary gear set (P4) is connected to a first shift element part (B2-1) of the second shift element (B2);
the fifth shaft (W5) is connected to a first shift element half (K4-1) of the sixth shift element (K4);
a second shift element half (B2-2) of the second shift element (B2) is connected to a second shift element half (K4-2) of the sixth shift element (K4);
the second shaft (W2) is connectable through the fifth shift element (K3) with the eighth shaft (W8);
the first shaft (W1) is connectable through the third shift element (K1) to the second shift element half (K4-2) of the sixth shift element (K4);
a fourth shaft (W4) is constantly fixed in a torque-proof manner; and
the third shaft (W3) is constantly connected to a sun gear (So-P1) of the first planetary gear set (P1).

3. The transmission (G) according to claim 1, wherein:
the sun gear (So-P4) of the fourth planetary gear set (P4) is connected to a second shift element half (K4-2) of the sixth shift element (K4);
the fifth shaft (W5) is connected to a first shift element half (K3-1) of the fifth shift element (K3);
a second shift element half (K3-2) of the fifth shift element (K3) is connected to a first shift element half (K4-1) of the sixth shift element (K4);
the second shaft (W2) is constantly connected to the eighth shaft (W8);
the first shaft (W1) is connectable through the third shift element (K1) with the sun gear (So-P4) of the fourth planetary gear set (P4);
a fourth shaft (W4) can be fixed in a torque-proof manner through the second shift element (B2); and
the third shaft (W3) is constantly connected to a sun gear (So-P1) of the first planetary gear set (P1).

4. The transmission (G) according to claim 1, wherein:
the sun gear (So-P4) of the fourth planetary gear set (P4) is connected to a first shift element half (B2-1) of the second shift element (B2);
a second shift element half (B2-2) of the second shift element (B2) is connected to a second shift element half (K4-2) of the sixth shift element (K4);
a first shift element half (K4-1) of the sixth shift element (K4) is connected to a second shift element half (K3-2) of the fifth shift element (K3);
a first shift element half (K3-1) of the fifth shift element (K3) is connected to the fifth shaft (W5);
the first shaft (W1) is connectable through the third shift element (K1) with the second shift element half (B2-2) of the second shift element (B2);
a fourth shaft (W4) is fixed in a torque-proof manner;
the third shaft (W3) is connected to a sun gear (So-P1) of the first planetary gear set (P1); and
whereas the second shaft (W2) is constantly connected to the eighth shaft (W8).

5. The transmission (G) according to claim 1, wherein:
the sun gear (So-P4) of the fourth planetary gear set (P4) is connected to a second shift element half (K4-2) of the sixth shift element (K4);
a first shift element half (K4-1) of the sixth shift element (K4) is connected to a second shift element half (K3-2) of the fifth shift element (K3);
a first shift element half (K3-1) of the fifth shift element (K3) is connected to the fifth shaft (W5);
the first shaft (W1) is connectable through the third shift element (K1) with the sun gear (So-P4) of the fourth planetary gear set (P4);
a fourth shaft (W4) is fixed in a torque-proof manner;
the third shaft (W3) is connectable through the second shift element (B2) with a sun gear (So-P1) of the first planetary gear set (P1); and
whereas the second shaft (W2) is connected to the eighth shaft (W8).

6. The transmission (G) according to claim 1, wherein:
the fourth planetary gear set (P4) is formed as a negative gear set or a positive gear set such that:
when the fourth planetary gear set (P4) is a negative gear set, a ring gear (Ho-P4) of the fourth planetary gear set (P4) is a component of the fourth shaft (W4), and the sixth shaft (W6) is connected to a bar (St-P4) of the fourth planetary gear set (P4); and
when the fourth planetary gear set (P4) is a positive gear set, the bar (St-P4) of the fourth planetary gear set (P4) is a component of the fourth shaft (W4), and the sixth shaft (W6) is connected to a ring gear (Ho-P4) of the fourth planetary gear set (P4).

7. The transmission (G) according to claim 1, wherein:
the sun gear (So-P4) of the fourth planetary gear set (P4) is connected to a second shift element half (K4-2) of the sixth shift element (K4);
the fifth shaft (W5) is connected to a first shift element half (K3-1) of the fifth shift element (K3);
a first shift element half (K4-1) of the sixth shift element (K4) is connected to a second shift element half (K3-2) of the fifth shift element (K3);
the third shaft (W3) is connected to a sun gear (So-P1) of the first planetary gear set (P1);
the first shaft (W1) is connectable through the third shift element (K1) with a sun gear (So-P4) of the fourth planetary gear set (P4);

a fourth shaft (W4) is fixed in a torque-proof manner;
the fourth planetary gear set (P4) is formed as a negative gear set or a positive gear set such that:
when the fourth planetary gear set (P4) is a negative gear set, a ring gear (Ho-P4) of the fourth planetary gear set (P4) is a component of the, fourth shaft (W4), and a bar (St-P4) of the fourth planetary gear set (P4) is connectable through the second shift element (B2) with the sixth shaft (W6); and
when the fourth planetary gear set (P4) is a positive gear set, the bar (St-P4) of the fourth planetary gear set (P4) is a component of the fourth shaft (W4), and the ring gear (Ho-P4) is connectable through the second shift element (B2) with the sixth shaft (W6).

8. The transmission (G) according to claim 1, wherein the transmission (G) has nine forward gears (1-9), and:
the first forward gear (1) arises through the locking of the first shift element (B1), the second shift element (B2), the third shift element (K1) and the sixth shift element (K4);
the second forward gear (2) arises through the locking of the first shift element (B1), the second shift element (B2), the fourth shift element (K2) and the sixth shift element (K4);
the third forward gear (3) arises through the locking of the second shift element (B2), the third shift element (K1), the fourth shift element (K2) and the sixth shift element (K4);
the fourth forward gear (4) arises through the locking of the second shift element (B2), the fourth shift element (K2), the fifth shift element (K3) and the sixth shift element (K4);
the fifth forward gear (5) arises through the locking of the second shift element (B2), the third shift element (K1), the fourth shift element (K2) and the fifth shift element (K3);
the sixth forward gear (6) arises through the locking of the second shift element (B2), the third shift element (K1), the fifth shift element (K3) and the sixth shift element (K4);
the seventh forward gear (7) arises through the locking of the third shift element (K1), the fourth shift element (K2), the fifth shift element (K3) and the sixth shift element (K4);
the eighth forward gear (8) arises through the locking of the first shift element (B1), the third shift element (K1), the fifth shift element (K3) and the sixth shift element (K4); and
the ninth forward gear (9) arises through the locking of the first shift element (B1), the fourth shift element (K2), the fifth shift element (K3) and the sixth shift element (K4).

9. The transmission (G) according to claim 8, wherein in each gear of the transmission (G), four of the six shift elements (B1, B2, K1, K2, K3, K4) are locked.

10. The transmission (G) according to claim 1, wherein the eighth shaft (W8) and the first shaft (W1) are connectable through a seventh shift element (K5).

11. The transmission (G) according to claim 10, wherein the seventh shift element (K5) does not have a continuously variable capability of transferring turning moment, and is formed as a claw shift element or a synchronization shift element.

12. The transmission (G) according to claim 10, wherein the transmission (G) has ten forward gears (21-210), and:
the first forward gear (21) arises through the locking of the first shift element (B1), the second shift element (B2), theسيxth shift element (K4) and the seventh shift element (K5);
the second forward gear (22) arises through the locking of the first shift element (B1), the second shift element (B2), the third shift element (K1) and the sixth shift element (K4);
the third forward gear (23) arises through the locking of the first shift element (B1), the second shift element (32), the fourth shift element (K2) and the sixth shift element (K4);
the fourth forward gear (24) arises through the locking of the second shift element (B2), the third shift element (K1), the fourth shift element (K2) and the sixth shift element (K4);
the fifth forward gear (25) arises through the locking of the second shift element (B2), the fourth shift element (K2), the fifth shift element (K3) and the sixth shift element (K4);
the sixth forward gear (26) arises through the locking of the second shift element (B2), the third shift element (K1), the fourth shift element (K2) and the fifth shift element (K3);
the seventh forward gear (27) arises through the locking of the second shift element (B2), the third shift element (K1), the fifth shift element (K3) and the sixth shift element (K4);
the eighth forward gear (28) arises through the locking of the third shift element (K1), the fourth shift element (K2), the fifth shift element (K3) and the sixth shift element (K4);
the ninth forward gear (29) arises through the locking of the first shift element (B1), the third shift element (K1), the fifth shift element (K3) and the sixth shift element (K4); and
the tenth forward gear (210) arises through the locking of the first shift element (B1), the fourth shift element (K2), the fifth shift element (K3) and the sixth shift element (K4).

13. The transmission (G) according to claim 12, wherein in each gear of the transmission (G), four of the seven shift elements (B1, B2, K1, K2, K3, K4, K5) are locked.

14. The transmission (G) according to claim 1, wherein the fourth planetary gear set (P4) is a positive gear set.

15. The transmission (G) according to claim 1, wherein the second shift element (B2) does not have a continuously variable torque transfer capacity of transferring turning moment, and is formed as a claw shift element or a synchronization shift element.

16. The transmission (G) according to claim 1, wherein the transmission (G) has a reverse gear (R, 2R) formed through the locking of the first shift element (B1), the second shift element (B2), the fifth shift element (K3) and the sixth shift element (K4).

17. The transmission (G) according to claim 1, wherein the third planetary gear set (P3) is arranged radially within the second planetary gear set (P2).

18. A drive train for a motor vehicle comprising the transmission (G) according to claim 1.

* * * * *